United States Patent
Lin et al.

(10) Patent No.: US 6,792,602 B2
(45) Date of Patent: Sep. 14, 2004

(54) METHOD AND DEVICE OF CONTROLLING EXTERNAL SYSTEM PARAMETERS USING ATA SIDE BAND

(75) Inventors: Cheun-Song Lin, Hsin-Chu (TW); Cheng-Yu Chen, Chia-Yi County (TW); Ching-Lung Tsai, Hsin-chu (TW); Cheu-Wei Hsu, Hsin-chu County (TW)

(73) Assignee: Promise Technology, Inc., Hsinchu (TW)

( * ) Notice: Subject to any disclaimer, the term of this patent is extended or adjusted under 35 U.S.C. 154(b) by 511 days.

(21) Appl. No.: 09/739,756

(22) Filed: Dec. 20, 2000

(65) Prior Publication Data

US 2002/0116547 A1 Aug. 22, 2002

(51) Int. Cl.[7] ................................................ G06F 3/00
(52) U.S. Cl. ........................ 719/310; 710/74; 700/286
(58) Field of Search ................................ 719/310, 305

(56) References Cited

U.S. PATENT DOCUMENTS 5,506,790 A * 4/1996 Nguyen ...................... 700/286
5,828,851 A * 10/1998 Nixon et al. ................ 710/105
5,884,086 A * 3/1999 Amoni et al. ............... 713/300
6,385,666 B1 * 5/2002 Thornton et al. ............... 710/2
6,460,099 B1 * 10/2002 Stryker et al. ................ 710/74

OTHER PUBLICATIONS

Matsuhashi, Selective Radio Call Receiver, Jul. 18, 1994.*
WD, ATA Packet Interface for streaming tape, 1994.*
Matsuhashi, Selective Radio Call Receiver, Jul. 18, 1994.*

* cited by examiner

Primary Examiner—Meng-Al T. An
Assistant Examiner—LeChi Truong
(74) Attorney, Agent, or Firm—Rabin & Berdo, P.C.

(57) ABSTRACT

The invention provides a solution/device for controlling external parameters by use of the same data cable and specific software to transfer/receive messages and monitor/control external parameters in a system. Additionally, the invention is compatible with ATA/ATAPI by using the ATA protocol or side-band protocol to make a main system communicate with other device(s) through an ATA/ATAPI device's data cable. Also, the invention uses the system's data cables and a non-standard controlling sequence to transfer and receive messages by the same cable to connect with the external devices for monitoring/controlling external parameters. Hence, the number of data wires needed is reduced. Also, the invention can decrease the manufacture costs and get a better heating dissipation.

9 Claims, 4 Drawing Sheets

METHOD AND DEVICE OF CONTROLLING EXTERNAL SYSTEM PARAMETERS USING ATA SIDE BAND

TECHNICAL FIELD

The invention provides a device that offers a solution/method for controlling external system parameters. It is compatible with ATA/ATAPI by using of ATA protocol or side-band protocol to make a main system communicate with other devices through original ATA/ATAPI device's data cable. The process and result of message transfer would not cause any affection on ATA/ATAPI device; besides, it can achieve the goal of controlling external system parameters.

The invention is a solution/method of transferring messages through a data cable, specifically, the standard and non-standard controlling sequences can co-exist in a system to transfer a defined original message under the standard controlling sequence and to transfer an extra message under a non-standard controlling sequence by via the data cable to communicate with the corresponding devices. Thus, external system parameters can be monitored and controlled, and the data cable would not affect the prior communication.

BACKGROUND OF THE INVENTION

Generally, a data storage device system is connected to a data cable (ATA) plunged into a the connector, of other end of the cable is connected to an external connection box device that has a hard driver or CD-ROM driver, for accessing or outputting message. Therein, the system must be equipped with a controlling sequence-defined by ATA for transferring message. For gathering out of the external connector box's parameter messages (e,g. power switch on/off, indicator lamp on/off, outer case's temperature and fan's rotating speed), the system must be added another data cables to connect with the external connection box device; the same as the external connection box device provides messages to others.

Above all, the system not only has to add specific-design loops but also has to add extra data cables for transferring and receiving message. Consequently, two pair data cables and an added specific-design loop are necessary; however, it will increase production cost. Furthermore, the added data cables and loops will block heat air currents, which will result to over-heated problem. This is the most urgent issue shall/must be solved and improved for the usage of users by the invention.

The inventor has been working on related computer product research for many years. Due to inconvenient for using of several data cables are necessary to transfer and receive message in a computer, the invention is developed for common using a single data cable (ATA) to connect the external connector box with the computer to read/access message or monitor parameters through it.

SUMMARY OF THE INVENTION

The invention's primary objective is the solution/device of controlling external parameters by using of the same data cable and specific software to transfer/receive message and monitor/controlling external parameters in a system.

The secondary object is the solution/device of controlling external parameters by using of the system's data cables and non-standard controlling sequence to transfer and receive message by the same cable connected with external device for monitoring/ controlling external parameters. Hence the advantages are the data cables reduced, the loops simplified, the manufacture costs decreased, and a better heating dissipation.

BRIEF DESCRIPTION OF DRAWING

To make clearly understanding of the manufacturing process, structures, specifications, functions, and advantages of the invention, two practicable applications and diagrams shown as following.

BRIEF DESCRIPTION OF THE TERMS

| | |
|---|---|
| system | (20) |
| software program | (21) |
| standard controlling procedure | (22) |
| temporary store device of standard controlling procedure | (221) |
| non standard controlling procedure | (23) |
| temporary store device of non-standard controlling procedure | (231) |
| data cable | (30) |
| external machine | (40) |
| external System | (41) |
| separator | (42) |
| external connection box device | (50) |

DETAILED DESCRIPTION OF THE INVENTION

Figure 1:
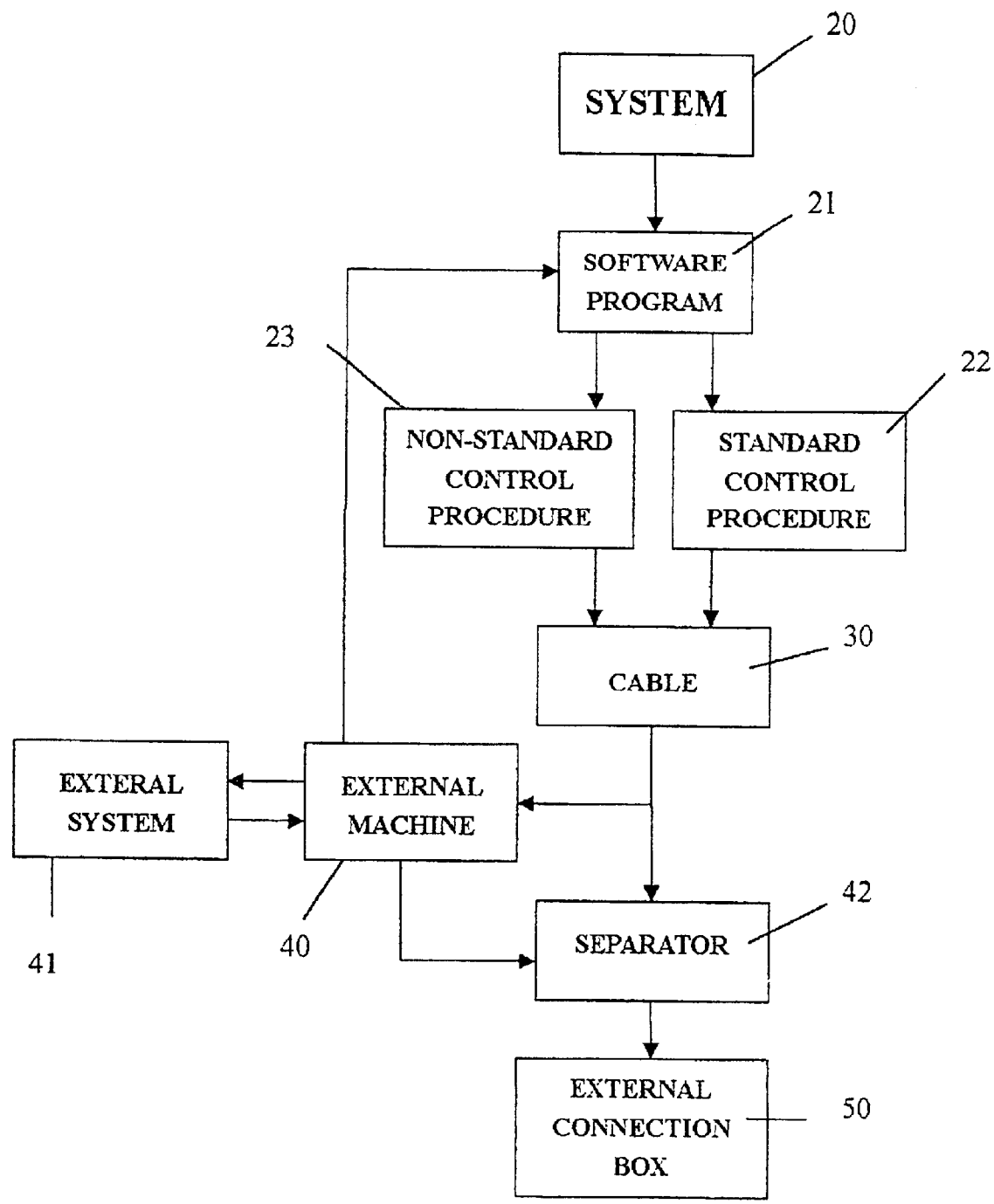
FIG. 1 is the block diagram of the first practicable application.
Figure 2:
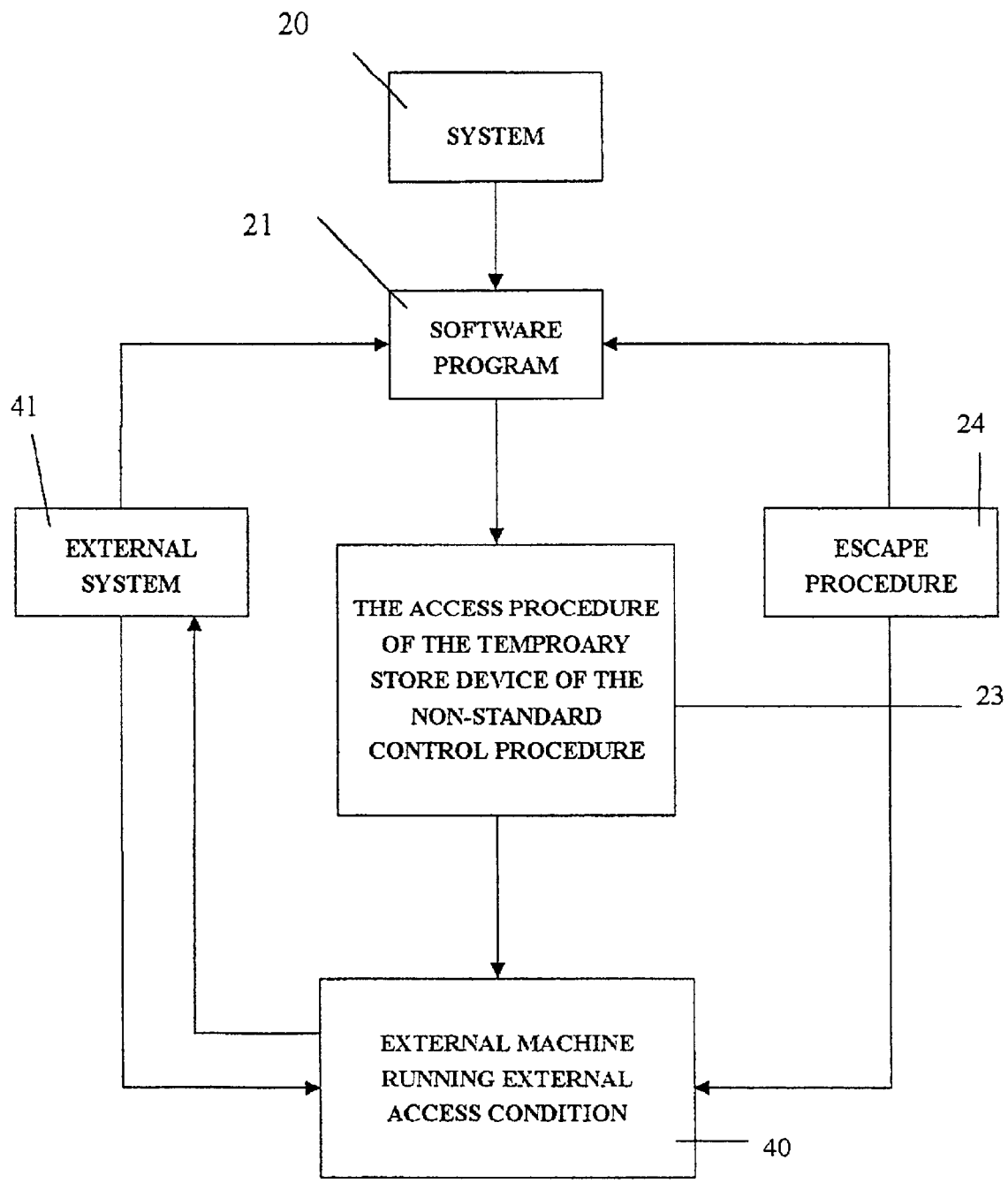
FIG. 2 is the external accessing diagram of the first practicable application.
Figure 3:
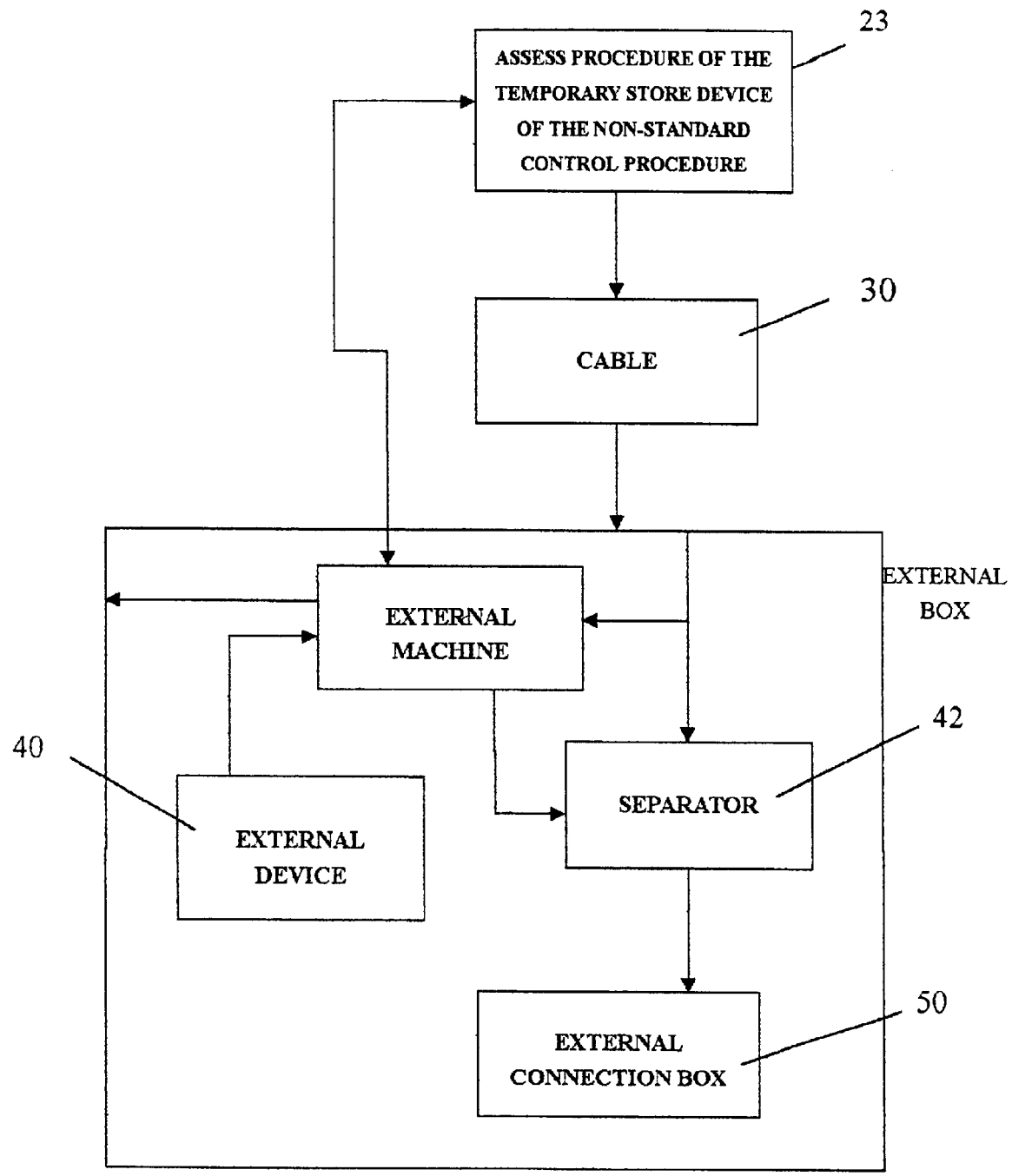
FIG. 3 is external system parameters monitoring diagram of the first practicable application.

Please refer to FIG. 1 and 2 for of the first practicable application. It illustrates the device/solution of controlling external system parameter including a system (20), a data cable (30), an external machine (40) and an external connection box device (50).

Please refer to the FIG. 1. Illustrates the system (20) including a build-in software program (21) for receiving and transferring messages, and a standard controlling procedure (22)—under the ATA Association's specification—connected with the software program (21), and a non-standard controlling procedure (23)—not in the ATA Association's specification but specified by the manufactures or users.

The data cable (30) is manufactured and followed the specification-regulated by ATA Association—of ATA standard in the system (20). Of the one end of the cable (30) connected with a standard controlling procedure (22) and a non-standards controlling procedure (23); the other end connected with an external machine (40) and an external connection box device (50), of the external machine (40) connected with an external system (41) and a separator (42). The separator is allocated on the cable (30) and between the external machine (40) and the external connection box (50). In receiving and transferring signals of the external machine (40) and the external connection box (50) is channeled through the cable (30), and those signals are readable and defined by them to provide the accessible message to the software program (21) for using in the system (20).

The external machine (40) of this invention is capable as an interface in several approaches as following:
1. The external machine (40) comprises hardware and software for receiving the specified message transferred from the cable (30).
2. The external machine (40) comprises ASIC and FPGA for receiving side-band protocol transferred from the cable (30).
3. The external machine (40) comprises hardware, software, ASIC and FPGA for receiving a specified message or side-band protocol transferred from the cable (30).

The basic principle of the invention of controlling external system parameters is explained as following:

Under the ATA or ATAPI device-compatible environment, the system will receive and transfer the procedure of non-agreement of ATA or side-band protocol by using of a specified software program (21) to be operating and adopted the external machine (40) to receive and transfer those extra messages. Those extra messages are readable or in preset status in the external system (41), which are allowed to monitor in an appropriate way.

The methods of this invention of controlling external system parameters are described as followed:
1. Under a certain procedure, the system (20) receives the signals and processing/gathering them internally, then transferred to the software program (21) for operating. Please, refer to FIG. 1. The software program (21) will transfer the normal information—defined by ATA Association—onto the standard controlling procedure (22), and save them in a relevant temporary store device (221) for acting. Accordingly, the normal message will be transferred/received onto the cable (30) under this approach.
2. As the system (20) receives the specified message to be operating by the software program (21). Please, refer to FIG. 1. The software program (21) will transfer the specific information—not defined by ATA Association—onto the external machine (40) and save them in a relevant temporary store device (231) for acting. Accordingly, the specified message will be transferred/received onto the cable (30) under this approach.

Above all, the normal and specified message will be transferred through the cable (30). For the external machine (40) and external connection box device (50) will receive the two kinds of messages transferred from the cable (30), and the external machine (40) is in the stage of monitoring to monitor the message transferred from the cables (30).
3. Please, refer to FIG. 1. When the external machine (40) receives the specific message—not followed to ATA's Agreement but specified by manufactures or users—from the cable (30). The external machine (40) will generate a signal to cut off the separator (42) to break the external connection box device (50) out and disconnect to the cable (30) for stopping further actions.
4. The non-ATA Association's definition model of specific agreement should corresponding match up with the external machine (40), so the external machine (40) can identify the specific messages transferred from the cable (30). When the external machine (40) receiving the specific signals that is followed the non-ATA Association, the external machine (40) will enter into an accessing/saving stage externally.
5. The external machine (40) is in accessing/saving stage externally for the specific messages, which are provided by the external machine (40) as a switch that will not in concern of the external connection box. The external machine (40) provides specific signals to correspond the system's (20) specific temporary store device for a preset of reading and writing to control the external system to act, or to disclosure the stage of external system.

It is knowingly of above description. The invention adopts a data cable (30)—under the standard definition of ATA and a compatible environment—to connect with the external connection box device (50)—the equipment of ATA/ATAPI—to be operating by the system's specific program through a presetting or reading/writing procedure in a specific temporary store device—out of ATA Association's definition. This specific procedure will be identified by the specific designed hardware, which is correspondent matching with external machine (40).

In general, the standard controlling procedures been defined by the ATA Association, which for transferring data of ATA/ATAPI's devices are under ATA Association's defined models (e.g. related documents and specifications). For this strict standard to be modeling the various manufactures makers to design and produce the devices of ATA/ATAPI and to make those devices (e.g. hard drivers, CD-ROM) transfer data correctly. For the standard said the definition of the signals of bus, of every temporary store that providing/controlling to ATA's/ATAPI's devices, of the procedures of command and combination, and of the relation of bus controlling signal sequences. For the controlling procedure sequence of ATA's/ATAPI's devices can be in three stages: 1) the presetting of controlling temporary device (standard address of 1F1h–1F6h), 2) the presetting of commanding temporary store device (standard address of 1F7h), and 3) message transferring. Please, refer to FIG. 2. Prior the stage 2, excluding the bits' presetting of software reset, otherwise there is no affection or error action to ATA's/ATAPI's devices.

For above account, the invention uses by the software program to execute a set of specific procedures of reading/resetting in controlling temporary device in stage 1; whereas not been by the specific software to operate or execute, so the specific procedure will not be occurred. Additionally, the specific procedure can be identified by the external system and its connector—external machine—to enter a saving/accessing stage. For the account of very strictly modeling pattern, sot any of unfit procedure will not allow to enter this stage, but in a status that has not in the stage concern.

When an external machine identifies this specific procedure, which will enter to so-called external saving/accessing stage. Please, refer to FIG. 1. For resetting to read/write in the stage, it has to be switching to external machine for providing the data, also is not in ATA's/ATAPI's concern. For example: writing a certain data in a certain controlling temporary device of the external machine, which will be saved and being seem as the provided signal to switch on/off of power or lamp. Other example as: the external machine is in reading/accessing stage, for the data from a certain temporary device; of those data provided by the external device that means the data are the messages of external system's temperature and fan's rotating speed. Wherein the external machine in reading/accessing stage, the software can be using of a so called deviated procedure, which makes the external machine deviate from reading/accessing stage and return to the original stage. This process can reach the purpose of controlling and monitoring the external parameters by the standard ATA's bus.

Figure 4:
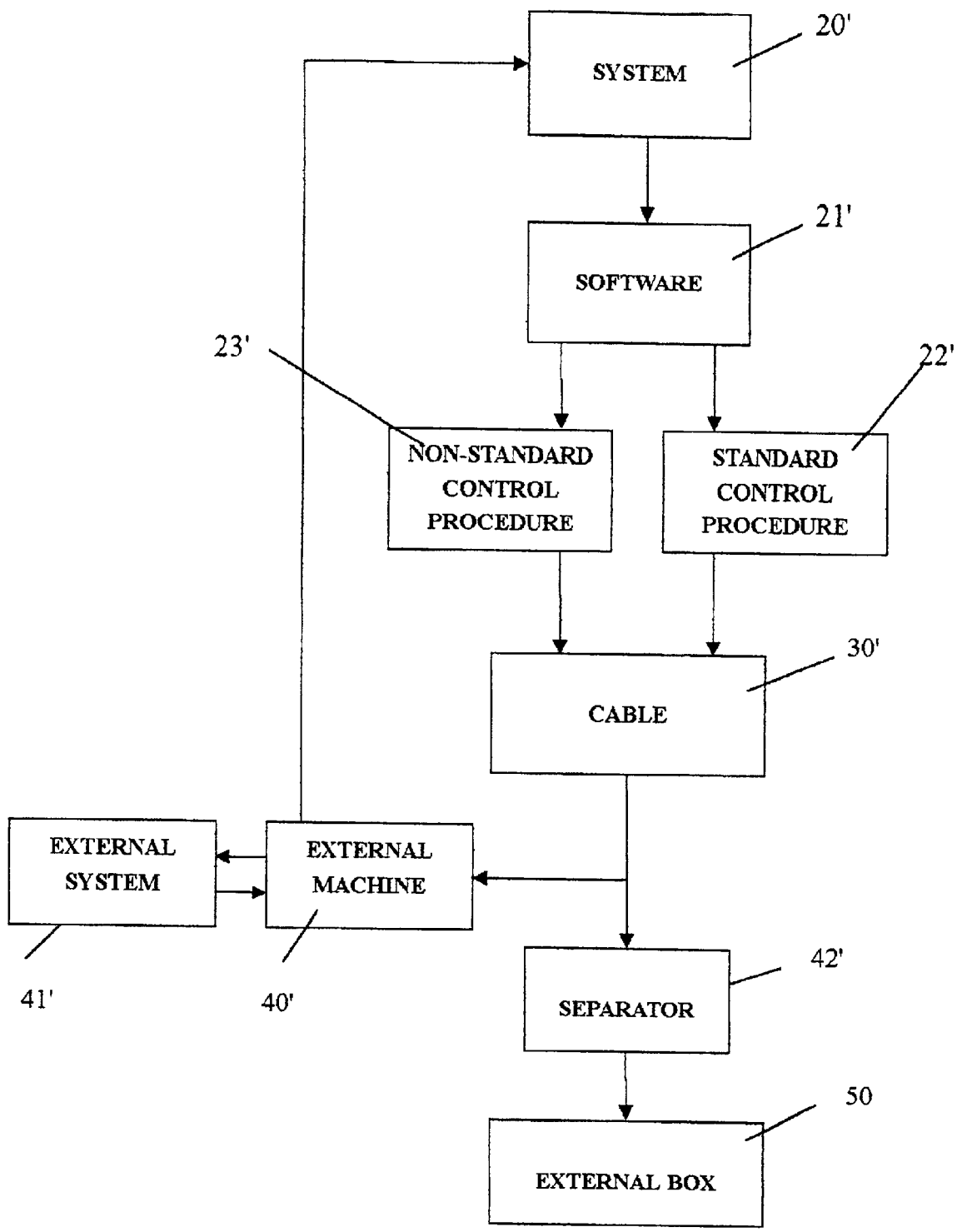
FIG. 4 is the block diagram of the second practicable application.

The second practical application of the invention is very similar to the first one. Please, refer FIG. 4. The differences is the software program (21') of the system (20') controls the relevant temporary store device of the standard controlling procedure (22'). The standard controlling procedure being generating the standard signal sequence—defined by ATA—of the relevant temporary device of the procedure specified by ATA'S pattern. Under PIO model, its sequence signals/side-band protocol (CSO#) address will be triggered by the saving/accessing of the controlling temporary store device.

For the sequence signals (CSO#) address transferring the cable to be the receiving acting for the external connection box device (50). The non-standard controlling procedure (23') of the being generating the non-standard signal sequence—its controlling sequence defined under a specific pattern. For the non-standard ATA's signal sequence of the relevant temporary device of non-standard controlling procedure, its sequence signals or (CSO#) address will be not triggered by the saving accessing of the controlling temporary store device. For the side-band protocol or (CSO#) address will not be acted and transferred though the data cable (30'), so the external connection box device (50') has no receiving action. For the interface of the external machine (40') is the machine connected with ASIC and FPGA. As the signal sequence generated from non-standard controlling sequence (23') of the system (20'), the external machine (40') will receive the signal sequence transferred from the data cable (30').

The non-standard controlling procedure (23') and is correspondent external machine (40') of the invention can identify the side-band protocol (CSO#) address generated from non-standard controlling procedure (23') but is no function sequence signal. Thereby, the system (20') can connect with a specific hardware, and the external connection box device (50')(ATA/ATAFI) the specific sequence, then, it will be transferred to an external machine (40'), available for identifying the specific sequence. So, the external machine can isolate the external connection box device by the specific data and only provide by the external machine to the purpose of controlling and monitoring the external parameters.

In conclusion, the invention—A Method and Device of Controlling External System Parameters Using ATA Side Band is using of connect the software program in the same cable for accessing the specific signal or side-band protocol to transfer or receive the specific message or signal ones. For the invention can simplify the cables and routes, and make no affection to the data cables and devices by using of the specific software to correspond external machine to read and reset the specific message to reach the external system parameters can be monitored. The invention has high utility in industry and high novelty and innovation therefore this invention will to meet the requirement of patent application.

What is claimed is:

1. A method of controlling external system parameters by use of a standard controlling procedure and a non-standard controlling procedure, wherein:

the non-standard controlling procedure is a special defined controlling procedure which links to a standard defined cable and the cable is connected to an external machine and an external connection box device, the external machine is also being connected with an external system, the controlling method is under a compatible environment, and the system is connected with a specific software program by use of the software to operate and make the non-standard controlling procedure generate specified information, a specific message of the non-standard controlling procedure can be identified by the external machine, and a normal message of the standard procedure and the specific message are transferred by the same cable, under a condition of that the external machine makes no affection to the external connection box device, the software program of the system will transfer and accept the specific message transferred from the cable, and the external machine will transfer and receive the specific message to a reading stage and to an isolation stage between the cable and external connection box device, and the external machine only employs the cable to transfer the specific information, and to be accessible for monitoring the external system parameters.

2. The invention of claim 1, wherein the non-standard procedure is a controlling procedure defined by non standard side-band protocol, wherein specific sequences generated by the non-standard controlling procedure only can be identified by the external machine, and wherein the external machine transfers and receives the specific message to enter into a reading stage, and only employs the cable to transfer the defined sequences and to be accessible for monitoring the external system parameters.

3. The invention of claim 2, wherein the external machine has an interface that can be hardware or software or ASIC or FPGA for receiving the specific sequences transferred from the cable.

4. The invention of claim 2, wherein a separator is disposed between the cable and the external connection box device, to selectively cut-off the cable from the external connection box device.

5. A device for controlling external system parameters using an ATA side band comprising:

a cable;

an external machine having a temporary store device;

an external correction box device; and means for executing a software program that cooperates with a standard controlling procedure and a non-standard controlling procedure, the software program operating the standard controlling procedure and the non-standard controlling procedure so as to make the temporary store device selectively active and to generate normal and specific messages to be transferred by the cable, wherein one end of the cable is connected with a the external machine and a the external connection box device, for the external machine can identify the specific message transferred from the cable but the external connection box device only can identify the normal message transferred from the cable, and all messages transferred into the cable will transfer to the external machine and external connection box device, wherein the external machine, upon receiving the specific message transferred from the cable, will generate for cutting off the external connection box device from the cable, and wherein the external machine, upon receiving the specific message, processes a preset operation used by the cable to transfer the message to connect with the temporary store device of the external machine to make the specific message to be monitored, or executes a procedure pertaining to the external system parameters.

6. The invention of claim 1, wherein the external machine has an interface that can be hardware or software or ASIC or FPGA for receiving the specific message transferred from the cable.

7. The invention of claim 5, wherein the external machine has an interface that can be hardware or software or ASIC or FPGA for receiving the specific message transferred from the cable.

8. The invention of claim 5, wherein the interface of the external machine has an interface that can be hardware or software or ASIC or FPGA for receiving the specific sequences transferred from the cable.

9. The invention of claim 5, further comprising a separator disposed between the cable and the external connection box device, to selectively cut-off the cable from the external connection box device.

* * * * *